US012652665B2

(12) United States Patent
Wei et al.

(10) Patent No.: US 12,652,665 B2
(45) Date of Patent: Jun. 9, 2026

(54) BEAM INDICATION FOR IAB

(71) Applicant: Intel Corporation, Santa Clara, CA (US)

(72) Inventors: Lili Wei, Portland, OR (US); Qian Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 18/278,693

(22) PCT Filed: May 10, 2022

(86) PCT No.: PCT/US2022/028554
§ 371 (c)(1),
(2) Date: Aug. 24, 2023

(87) PCT Pub. No.: WO2022/240852
PCT Pub. Date: Nov. 17, 2022

(65) Prior Publication Data
US 2024/0147472 A1 May 2, 2024

Related U.S. Application Data

(60) Provisional application No. 63/187,119, filed on May 11, 2021.

(51) Int. Cl.
H04W 72/1273 (2023.01)
H04W 72/044 (2023.01)
(Continued)

(52) U.S. Cl.
CPC ..... H04W 72/1273 (2013.01); H04W 72/046 (2013.01); H04W 72/1268 (2013.01); H04W 72/231 (2023.01); H04W 76/20 (2018.02)

(58) Field of Classification Search
CPC ........... H04W 72/1273; H04W 72/046; H04W 72/1268; H04W 72/231; H04W 76/20;
(Continued)

(56) References Cited

U.S. PATENT DOCUMENTS

2018/0249453 A1* 8/2018 Nagaraja .............. H04B 7/0632
2020/0313819 A1* 10/2020 Zhou ..................... H04W 24/10
(Continued)

FOREIGN PATENT DOCUMENTS

JP        2023546936      11/2023
WO    WO-2020214280 A1    10/2020
(Continued)

OTHER PUBLICATIONS

3GPP TS 38.306 V16.4.0 (Mar. 2021) (Year: 2021).*
(Continued)

*Primary Examiner* — Nicholas Jensen
*Assistant Examiner* — Ayodele Lawrence Olubodun
(74) *Attorney, Agent, or Firm* — Schwegman Lundberg & Woessner, P.A.

(57) ABSTRACT

An apparatus and system for beam indication in an integrated access backhaul (IAB) are described. A parent IAB distributed unit (DU) (IAB-DU) provides abeam restriction for restricting beams that a Mobile-Termination (MT) of a child IAB (IAB-MT) are not to use, an early physical downlink shared channel (PDSCH) beam indication or physical uplink shared channel (PUSCH) beam indication, or an explicit beam indication for transmission of an IAB-MT-specific PDSCH or PUSCH by an IAB-DU collocated with the IAB-MT. Radio resource control (RRC) signaling, a Medium Access Control (MAC) control element (CE), or downlink control information (DCI) contains the beam information.

20 Claims, 9 Drawing Sheets

(51) Int. Cl.

| | |
|---|---|
| *H04W 72/1268* | (2023.01) |
| *H04W 72/231* | (2023.01) |
| *H04W 76/20* | (2018.01) |

(58) Field of Classification Search
CPC .......................... H04W 84/047; H04W 88/085; H04B 7/0639; H04L 5/0007; H04L 5/0044; H04L 5/0053; H04L 5/0094; H04L 5/0023; H04L 27/26025
See application file for complete search history.

(56) References Cited

U.S. PATENT DOCUMENTS

| | | | | |
|---|---|---|---|---|
| 2021/0385057 | A1* | 12/2021 | Zhou | H04B 17/327 |
| 2021/0409093 | A1* | 12/2021 | Sakhnini | H04W 56/001 |
| 2022/0322383 | A1* | 10/2022 | Zewail | H04W 72/20 |
| 2022/0376851 | A1* | 11/2022 | Noh | H04L 5/001 |
| 2023/0421316 | A1* | 12/2023 | Laddu | H04B 7/0408 |
| 2024/0048333 | A1* | 2/2024 | Bhamri | H04W 72/1273 |
| 2024/0146480 | A1* | 5/2024 | Ghanbarinejad | H04L 5/0051 |
| 2024/0187080 | A1* | 6/2024 | Ghanbarinejad | H04B 7/06968 |
| 2025/0008515 | A1* | 1/2025 | Ghanbarinejad | H04W 88/08 |

FOREIGN PATENT DOCUMENTS

| | | |
|---|---|---|
| WO | 2022008407 | 1/2022 |
| WO | WO-2022240852 A1 | 11/2022 |

OTHER PUBLICATIONS

"International Application Serial No. PCT/US2022/028554, International Search Report mailed Aug. 23, 2022", 4 pgs.

"International Application Serial No. PCT/US2022/028554, Written Opinion mailed Aug. 23, 2022", 5 pgs.

Lenovo, et al., "Enhancements to resource multiplexing for IAB", R1-2005927, 3GPP TSG RAN WG1 Meeting #102-e, e-Meeting, (Aug. 8, 2020), 5 pgs.

Nokia, et al., "Enhancements for resource multiplexing among IAB backhaul and access links", R1-2005535, 3GPP TSG RAN WG1 #102-e, e-Meeting, (Aug. 7, 2020), 4 pgs.

NTT DOCOMO, Inc, "Resource multiplexing between child and parent links of an IAB node", R1-2103591, 3GPP TSG RAN WG1 #104bis-e, e-Meeting, (Apr. 7, 2021).

NTT DOCOMO, Inc, "Resource multiplexing between child and parent links of an IAB node", R1-2006744, 3GPP TSG RAN WG1 #102-e, e-Meeting, (Aug. 7, 2020), 3 pgs.

"Japanese Application Serial No. 2023-557008, Notification of Reasons for Refusal mailed Feb. 24, 2026", w English translation, 7 pgs.

* cited by examiner

MT RX/DU TX

MT TX/DU RX

MT RX/DU RX

MT TX/DU TX

| R | Serving Cell ID | | | | | | BWP ID |
|---|---|---|---|---|---|---|---|
| | $T_6$ | $T_5$ | $T_4$ | $T_3$ | $T_2$ | $T_1$ | $T_0$ |
| | $T_{14}$ | $T_{13}$ | $T_{12}$ | $T_{11}$ | $T_{10}$ | $T_9$ | $T_8$ |

| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8+1}$ |
|---|---|---|---|---|---|---|---|

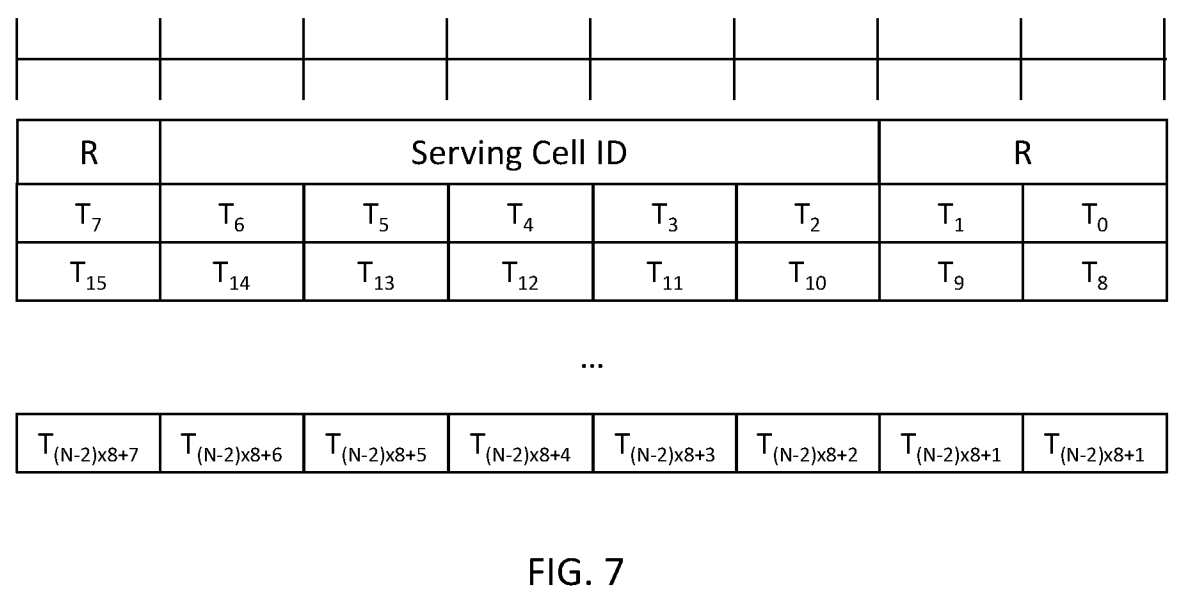

| R | | | | | | | |
|---|---|---|---|---|---|---|---|

| | R | | | | | | R |
|---|---|---|---|---|---|---|---|
| Serving Cell ID | | | | | | | |
| $T_7$ | $T_6$ | $T_5$ | $T_4$ | $T_3$ | $T_2$ | $T_1$ | $T_0$ |
| $T_{15}$ | $T_{14}$ | $T_{13}$ | $T_{12}$ | $T_{11}$ | $T_{10}$ | $T_9$ | $T_8$ |

...

| $T_{(N-2)x8+7}$ | $T_{(N-2)x8+6}$ | $T_{(N-2)x8+5}$ | $T_{(N-2)x8+4}$ | $T_{(N-2)x8+3}$ | $T_{(N-2)x8+2}$ | $T_{(N-2)x8+1}$ | $T_{(N-2)x8+1}$ |
|---|---|---|---|---|---|---|---|

FIG. 7

BEAM INDICATION FOR IAB

PRIORITY CLAIM

This application is a U.S. National Stage Filing under 35 U.S.C. 371 from International Application No. PCT/US2022/028554, filed May 10, 2022 and published in English as WO 2022/240852 on Nov. 17, 2022, which claims the benefit of priority to U.S. Provisional Patent Application Ser. No. 63/187,119, filed May 11, 2021, each of which is incorporated herein by reference in its entirety.

TECHNICAL FIELD

Embodiments pertain to next generation (NG) wireless communications. In particular, some embodiments related to beam indications for an integrated access backhaul (IAB) node.

BACKGROUND

The use and complexity of next generation (NG) or new radio (NR) wireless systems, which include 5G networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 5 illustrates Transmission Configuration Indicator (TCI) restriction in accordance with some embodiments.

FIG. 7 illustrates TCI activation in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
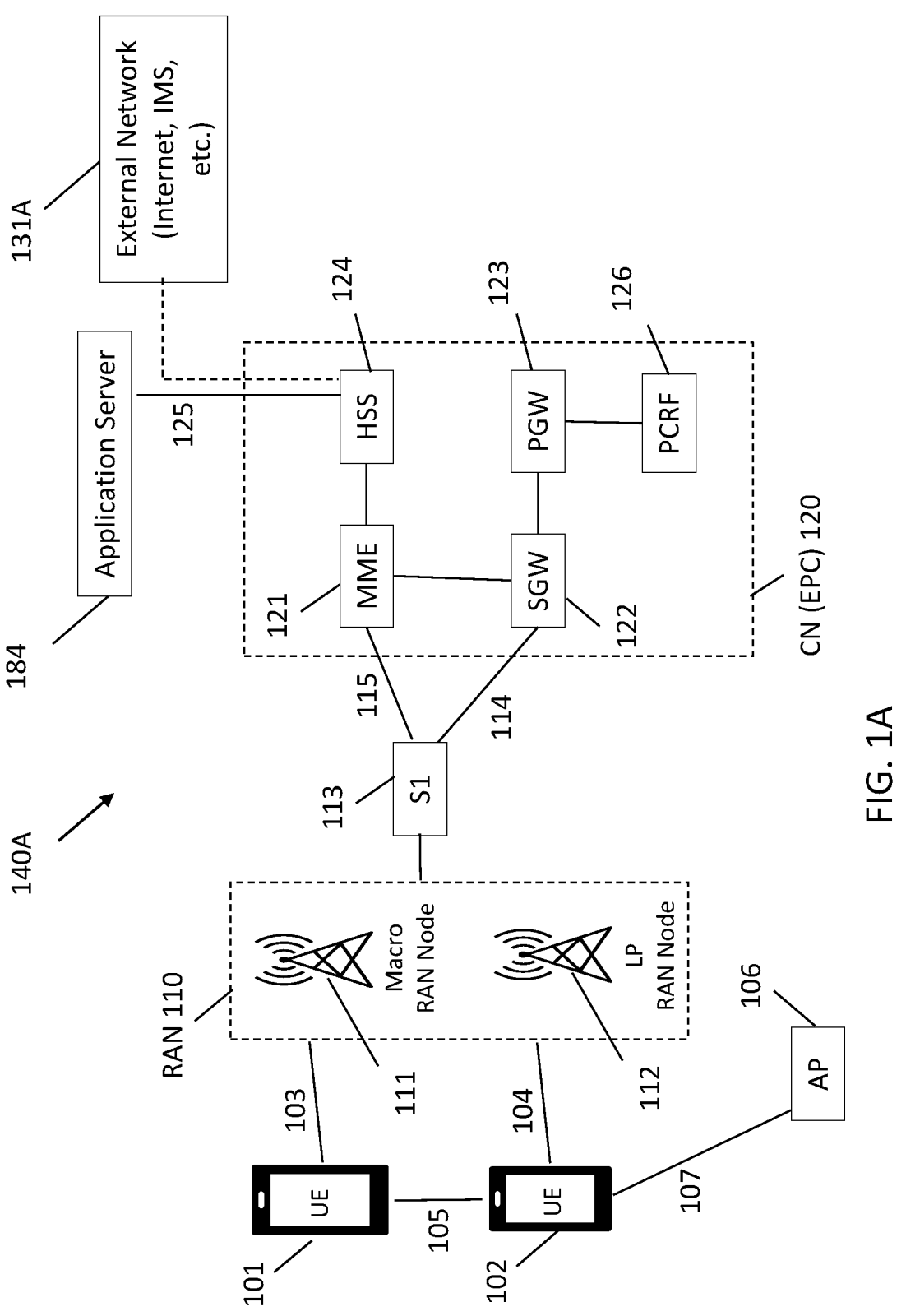
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs— and thus is more generally referred to as Radio Access Network node (RANnode).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and fronthaul (F) F1 interface. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and the DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
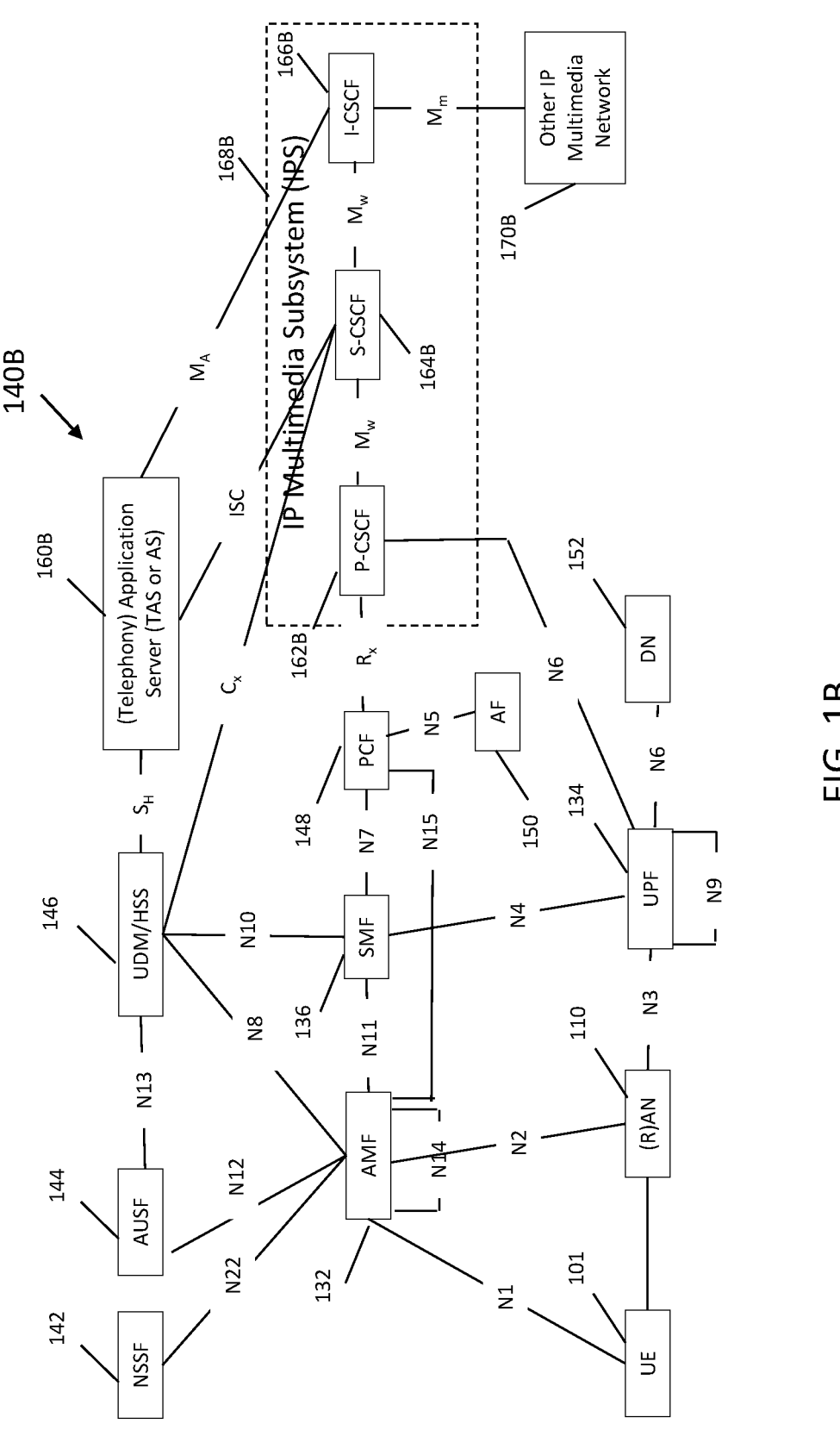
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
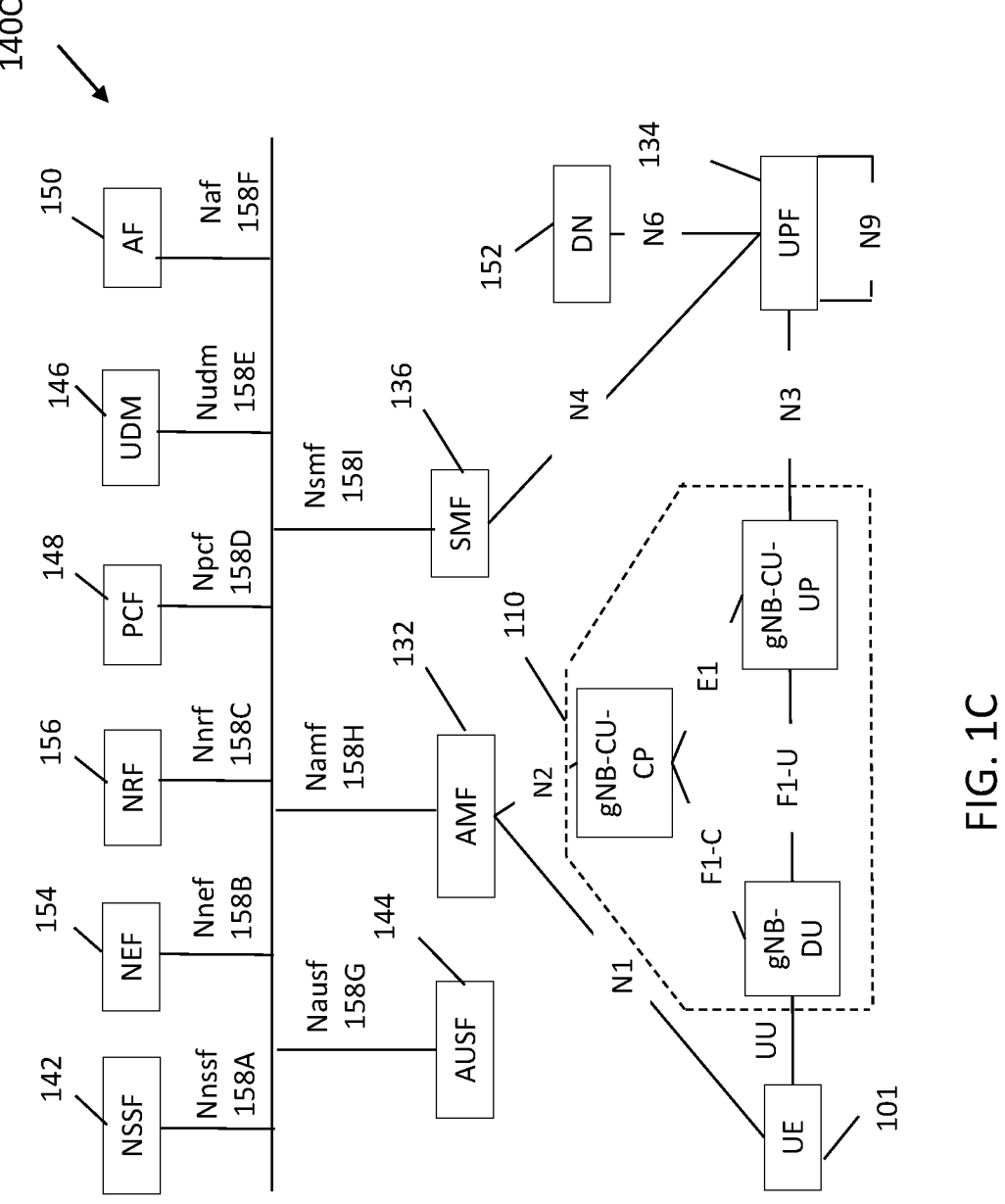
FIG. 1C illustrates a non-roaming 5G system architecture in accordance with some aspects.

FIG. 1C illustrates a 5G system architecture 140C and a service-based representation. In addition to the network entities illustrated in FIG. 1, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
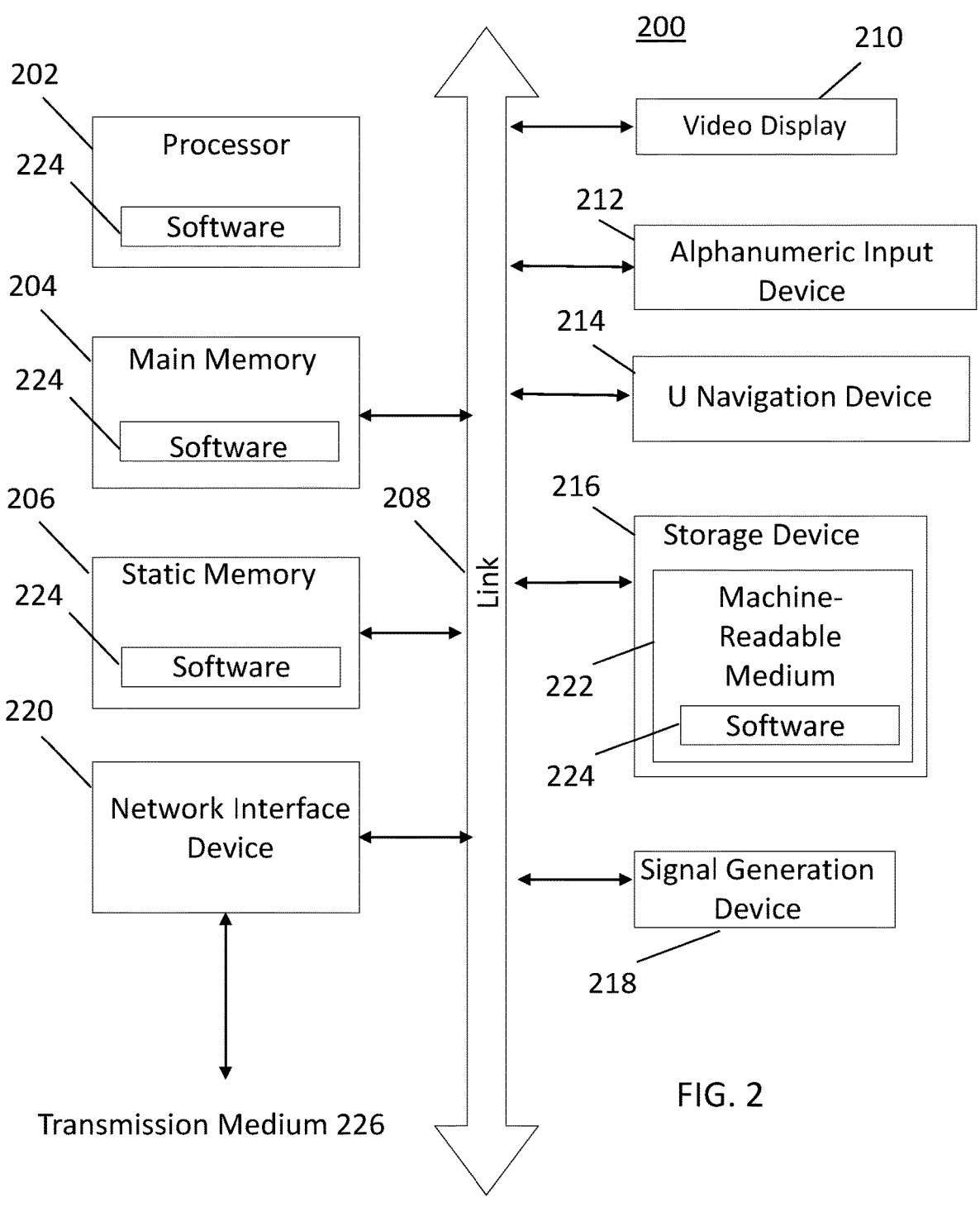
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.1 lad, IEEE 802.1 lay, etc.), technologies operating above 300 GHz and THz bands, (3GPP/LTE based or IEEE 802.11p or IEEE 802.1 lbd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.1 lbd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, IAB networks are used for wireless backhaul to provide an alternative to fiber optical connections. The gNB, which provides both user plane and control plane connectivity between the UE and the core network, can be a single logical node or may contain multiple logical nodes, the latter of which include a central unit (CU) and one or more distributed unit(s) (DU(s)). The CU hosts the radio resource control (RRC), service data adaptation protocol (SDAP), and packet data convergence protocol (PDCP) layers of the gNB that control the operation of the DU. The DU, on the other hand, hosts the radio link control (RLC), medium access control (MAC) and physical (PHY) layers of the gNB. The CU and the DU it controls are connected via the F1 interface. The F1 application protocol (F1-AP) is used for conveying the lower-layer configuration information of the radio bearers between the CU and DU, as well as for setting up a GTP tunnel between the DU and CU for each radio bearer.

The IAB network supports features including permitting network topology adaptation and providing redundancies, multi-hop backhauling, in-/out-of-band relaying (using the same or different carrier frequencies used by UEs as for the backhaul links), and QoS differentiation and enforcement. The IAB network contains parent and child nodes, in which parent nodes provide both user and control plane functionality to their child nodes. The IAB nodes may contain the CU/DU split architecture of the gNB, where the IAB node terminates the DU functionality and the IAB donor (gNB) terminates the CU functionality. The IAB node protocol stack contains a mobile termination (MT) and an IAB DU.

The MT is used to communicate with a parent node. The IAB DU is used to communicate with a child node or a normal UE.

Multi-hop forwarding is enabled via a backhaul adaptation protocol (BAP). The IAB donor assigns a unique L2 address (BAP address) to each IAB node controlled by the IAB donor. The BAP of the origin node (IAB donor DU for downlink traffic, and the access IAB node for the uplink traffic) adds a BAP header to packets being transmitted, which include a BAP routing ID (e.g., the BAP address of the destination/source IAB node and an optional path ID). Each IAB node has a routing table (configured by the IAB donor CU) containing the next hop identifier for each BAP routing ID. Separate routing tables are kept for uplink and downlink transmissions, where the downlink and uplink tables are respectfully used by the IAB DU and MT.

IAB nodes support Frequency Division Multiplexing (FDM), Time Division Multiplexing (TDM), and Spatial Division Multiplexing (SDM) between access and backhaul links for simultaneous operation. For in-band operation, the MT and IAB DU follow half-duplex constraints: one cannot receive when the other is transmitting. Thus, MT and IAB DU time-domain resources are configured as Downlink, Uplink, or Flexible, indicating the transmission direction of a given resource.

To coordinate the MT and IAB DU (and to handle the half-duplex constraint), IAB DU resources are further configured by the CU as Hard, Soft, or Not Available (H/S/NA). A hard DU resource is available in the configured transmission direction(s) without the IAB node having to consider the impact on the corresponding MT resources. In this case, MT resources corresponding to a hard DU resource (of the same IAB node) are not available, as it cannot be guaranteed that the MT can properly transmit/receive on these resources.

In contrast to hard resources, a soft DU resource can only be used if the use does not impact the MT's ability to transmit and/or receive according to its configuration and scheduling. There are different ways for an IAB node to determine that a particular soft DU resource is available. For example, the IAB DU can use the resource when, for example, a particular MT resource is configured as uplink but no uplink data is available for MT transmission or the MT may not have a valid uplink scheduling grant. Furthermore, if the IAB node is capable of simultaneous IAB DU and MT, even if the MT has a valid scheduling grant and there is uplink data available for transmission, the IAB DU can transmit on soft resources. If the IAB node is capable of full-duplex operation between the IAB DU and MT, the IAB DU can always use a soft resource. In some circumstances, the parent node may provide an explicit indication that a particular MT resource will not be used, thus making a corresponding soft DU resource available.

The IAB DU may have a semi-static resource configuration that allows the CU to provide H/S/NA attributes with a granularity of per IAB DU cell, without considering the component carriers (CCs) of the co-located IAB MT. However, Rel-17 IAB is to support simultaneous operation and dual-connectivity at an IAB node. Since the IAB MT under different CC may have different downlink/uplink/flexible (D/U/F) configurations and multiplexing capability between collocated MT and DU is based on {MT CC, DU cell} pair, the H/S/NA attribute of an IAB DU should be enhanced to be configured with granularity of per {MT CC, DU cell} pair. That is, an IAB-MT can operate under different CCs, and an IAB-DU can provide multiple serving cells. The H/S/NA attributes of an IAB-DU can be semi-statically configured with granularity of per {MT CC, DU cell} pair, i.e., each H/S/NA configuration corresponds to a specific MT CC and a specific DU cell.

Figure 3:
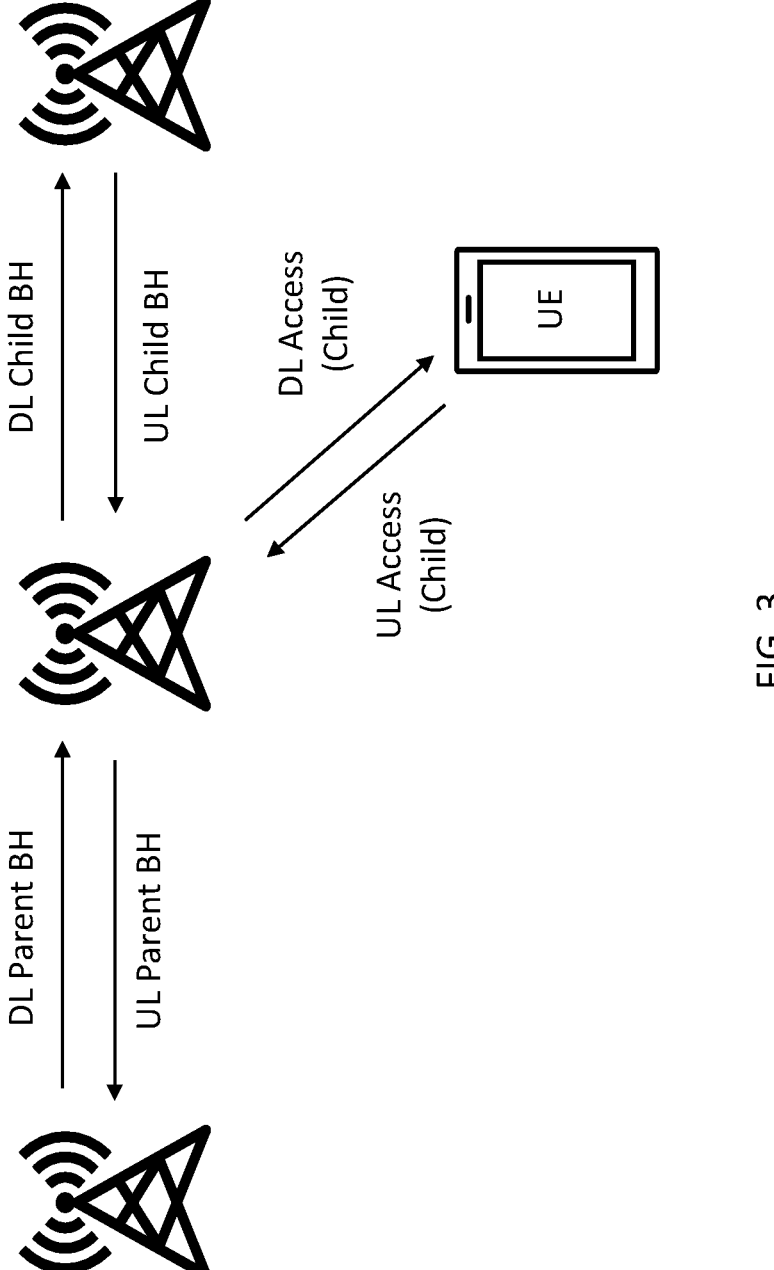
FIG. 3 illustrates different IAB link types in accordance with some embodiments.

In an IAB Network, an IAB node can connect to its parent node (an IAB donor or another IAB node) through a parent BH link, connect to a child UE through child access (AC) link, and/or connect to its child IAB node through a child BH link. FIG. 3 illustrates different IAB link types in accordance with some embodiments. As described above, the CU/DU split in the IAB has been leveraged where each IAB node holds a DU (through which the IAB node communicates with its child UEs and child MTs like a base station) and a MT function (through which the IAB node connects to its parent IAB node or the IAB donor like a UE). Radio Resource Control (RRC) signaling is used between the CU in the IAB donor and the UE/MT, while F1AP signaling is used between the CU and the DU in an IAB node.

Rel-16 IAB MT/IAB DU Semi-Static Resource Configuration

In 3GPP RAN1 #94bis, a number of statements on DU/MT resource configuration have been agreed. These statements include, from a MT point-of-view, the following time-domain resources can be indicated for the parent link as in NR Release-15 (D/U/F): Downlink time resource, Uplink time resource, Flexible time resource. In addition, from a DU point-of-view, the child link has the following types of time-domain resources (D/U/F/NA): Downlink time resource, Uplink time resource, Flexible time resource, Not available (NA) time resources (not to be used for communication on the DU child links). For each of the downlink, uplink and flexible time-resource types of the DU child link, there are two flavors: hard and soft (H/S): Hard: The corresponding time resource is always available for the DU child link, Soft: The availability of the corresponding time resource for the DU child link is explicitly and/or implicitly controlled by the parent node.

In addition, RAN1 #97 and RAN1 #98bis have made the following agreements regarding DU semi-static resource configuration: The resources are configured on a per DU (cell) basis, and H/S/NA attributes for the per-cell DU resource configuration are explicitly indicated per-resource type (D/U/F) in each slot. Hence, an IAB DU's semi-static resource configuration is first indicated with per-DU serving cell D/U/F resource type, and then H/S/NA attributes are explicitly indicated per-resource type based on D/U/F in each slot.

Simultaneous Operations and Dual-Connectivity in Rel-17 IAB

In NR Rel-16 specifications, the IAB section are focused on supporting TDM-based DU function and MT function within an IAB node. One objective of Rel-17 IAB RAN1 is specification enhancements to the resource multiplexing between child and parent links of an IAB node, including: support of simultaneous operation (transmission and/or reception) of IAB node's child and parent links (i.e., MT Tx/DU Tx, MT Tx/DU Rx, MT Rx/DU Tx, MT Rx/DU Rx), and support for dual-connectivity scenarios defined by RAN2/RAN3 in the context of topology redundancy for improved robustness and load balancing.

Figures 4A, 4B, 4C, 4D:
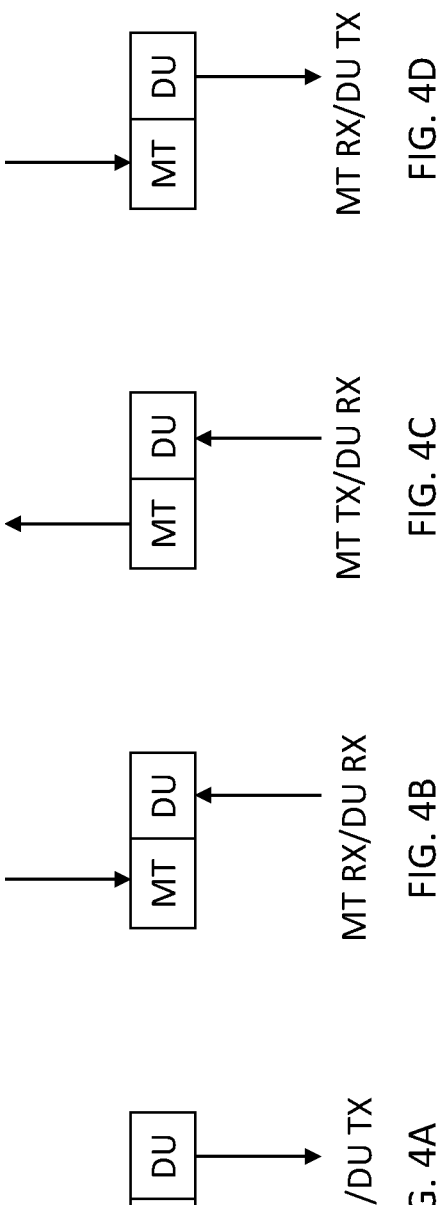
FIG. 4A illustrates a first simultaneous transmission in accordance with some embodiments.
FIG. 4B illustrates a second simultaneous transmission in accordance with some embodiments.
FIG. 4C illustrates a third simultaneous transmission in accordance with some embodiments.
FIG. 4D illustrates a fourth simultaneous transmission in accordance with some embodiments.

Simultaneous operation (transmission and/or reception) of IAB node's child and parent links includes four cases shown in FIGS. 4A-4D. FIG. 4A illustrates a first simultaneous transmission in accordance with some embodiments. In particular, FIG. 4A shows an embodiment in which MT TX/DU TX. FIG. 4B illustrates a second simultaneous transmission in accordance with some embodiments. FIG. 4B shows an embodiment in which MT RX/DU RX. FIG. 4C illustrates a third simultaneous transmission in accordance with some embodiments. FIG. 4C shows an embodiment in which MT TX/DU RX. FIG. 4D illustrates a fourth simultaneous transmission in accordance with some embodiments. FIG. 4D shows an embodiment in which MT RX/DU TX.

In addition, in the spatial-domain, the current Rel-16 beam indication is based on the Transmission Configuration Indicator (TCI) or spatial relation information with reference signals (signaling system block (SSB), channel state information reference signals (CSI-RS) or sounding reference signals (SRS)). For example, a physical downlink control channel (PDCCH) beam indication is based on a TCI indication configured by RRC TCI states and a MAC control element (CE); while a physical downlink shared channel (PDSCH) beam indication is based on a TCI indication configured by RRC TCI states, MAC CE, and TCI field in downlink control information (DCI) (if present). In addition, a scheduling offset threshold is used to decide whether the PDSCH follows default beam or the indicated TCI beam. For the IAB network, enhancements for IAB beam indication based on Rel-16 specifications are used for the co-located IAB-MT and IAB-DU to share the spatial-domain resources. The Rel-16 beam indication is currently designed for a UE and not for an IAB-node.

Beam Indication Enhancement Option 1: Parent DU Transmits Beam Restriction to Inform an IAB-MT which Beam(s) not to Use In this option, instead of using a beam indication to inform an IAB-MT which beam to use, a parent DU can transmit a beam restriction to inform the IAB-MT which beam(s) not to use. The spatial-domain resources that are indicated to not be used may then be reserved for the co-located IAB-DU. A proposed beam restriction from the parent DU to IAB-MT for PDSCH beam indication is shown below; other channel beam indications can be similarly applied.

Restrict TCI-State in RRC Signaling

In Rel-16 NR specification, up to 128 TCI states can be configured by the RRC information element (IE) PDSCH-config as beam candidates. Accordingly, the TCI states can be configured as beam restrictions (i.e., the indicated beams/ TCI-states cannot be used). One embodiment of the PDSCH-config IE is:

```
PDSCH-Config ::=                         SEQUENCE {
    dataScramblingIdentityPDSCH              INTEGER (0..1023)     OPTIONAL,
    dmrs-DownlinkForPDSCH-MappingTypeA SetupRelease { DMRS-
DownlinkConfig }   OPTIONAL,
    dmrs-DownlinkForPDSCH-MappingTypeB SetupRelease { DMRS-
DownlinkConfig }   OPTIONAL,
    tci-StatesToAddModList    SEQUENCE (SIZE(1..maxNrofTCI-States)) OF
TCI-State   OPTIONAL,
    tci-StatesToReleaseList    SEQUENCE (SIZE(1..maxNrofTCI-States)) OF
TCI-StateId   OPTIONAL,
    tci-StatesRestrictToAddModList SEQUENCE (SIZE(1..maxNrofTCI-
```

```
States)) OF TCI-State-Restrict OPTIONAL,
    tci-StatesRestrictToReleaseList SEQUENCE (SIZE(1..maxNrofTCI-
States))OF TCI-StateId-Restrict OPTIONAL,
    ...
}
TCI-State-Restrict ::=              SEQUENCE {
    tci-StateId-Restrict           TCI-StateId-Restrict,
    qcl-Type1                      QCL-Info,
    qcl-Type2                      QCL-Info            OPTIONAL,
    ...
}
```

Antenna ports are Quasi Co-located (QCL) if properties of the channel over which a symbol on one antenna port is conveyed can be inferred from the channel over which a symbol on the other antenna port is conveyed.

Restrict TCI-State in MAC CE

In current NR specification TS 38.321, the logic channel identifier (TD) (LCTD) field that identifies the logical channel instance ofithe corresponding MAC service data unit (SDU) or the type of the corresponding MAC CE or padding for the downlink shared channel (DL-SCH) is described in the following table. One ofthe reserved LCIDs (LCD 35-46) may be used to transmit the TCI states restriction/de-restriction for an AB-MT-specific PDSCH.

Values of LCID for DL-SCH

| Codepoint/ Index | LCID values |
|---|---|
| 0 | CCCH |
| 1-32 | Identity of the logical channel |
| 33 | Extended logical channel ID field (two-octet eLCID field) |
| 34 | Extended logical channel ID field (one-octet eLCID field) |
| 35-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

FIG. 5 illustrates Transmission Configuration Indicator (TCI) restriction in accordance with some embodiments. In particular, FIG. 5 shows that the TCI states restriction/de-restriction for an IAB-MT-specific PDSCH MAC CE may have a variable size of different fields. The Ti field is set to 1 to indicate that the TCI state with TCI-StateId-Restrict i is to be restricted; and is set to 0 to indicate that the TCI state with TCI-StateId-Restrict i is to be de-restricted. The maximum number of restricted TCI states for the IAB-MT can be set to 8 or a larger value. TCI states may be dynamically sent over in a DCI message that includes configurations such as QCL-relationships. Each TCI-State contains parameters for configuring a QCL relationship.

Restrict TCI-State in DCI

In the current NR specification, the DCI can be used to further identify one of the MAC CE selected candidate TCI states for the IAB-MT's PDSCH. The TCI field in DCI is fixed to 3 bits, and the indicated TCI is selected from the candidate TCI states in the IAB-MT's PDSCH slot. If the TCI is not present in the DCI, the PDSCH follows the TCI of the scheduling PDCCH. Accordingly, a TCI-restrict field may be added to the DCI to restrict one of the MAC CE restricted TCI states for an IAB-MT's PDSCH. The TCI-restrict field in the DCI can be fixed to 3 bits or more, and the corresponding TCI is restricted from the IAB-MT's PDSCH slot.

The various embodiments for the beam restriction transmission above can be applied independently or jointly.

Beam Indication Enhancement Option 2: Early PDSCH/PUSCH Beam Indication for IAB-MT (e.g., Enhanced K0/K2 Configuration for IAB)

In Rel-16, K0 is defined as the L1 delay offset parameter between the DCI in the PDCCH and its scheduled PDSCH [TS 38.214-clause 5.1.2.1]; while K2 is defined as the L1 delay offset parameter between the uplink (UL) assignment in the PDCCH and its scheduled PUSCH data transmission [TS38.214-clause 6.1.2.1]. For early PDSCH/PUSCH beam indication for an IAB-MT, the K0/K2 configuration may be used to benefit the co-located IAB-DU to leverage the spatial-domain resource in a timely manner.

Enhance preferredK0 and preferredK2 Parameters for an IAB-MT

In Rel-16 TS 38.331, the RRC parameter minSchedulingOffsetPreference-r16 is defined in the RRC MinSchedulingOffsetPreference-r16 IE to configure the UE's preference on minimum scheduling offset of cross-slot scheduling, in which preferredK0 and preferredK2 are configured for different subcarrier spacings (SCSs).

```
UEAssistanceInformation-v1610-IEs ::= SEQUENCE {
    idc-Assistance-r16              IDC-Assistance-r16          OPTIONAL,
    drx-Preference-r16              DRX-Preference-r16          OPTIONAL,
    maxBW-Preference-r16                MaxBW-Preference-r16
OPTIONAL,
    maxCC-Preference-r16                MaxCC-Preference-r16
OPTIONAL,
    maxMIMO-LayerPreference-r16         MaxMIMO-LayerPreference-r16
OPTIONAL,
```

-continued

```
    minSchedulingOffsetPreference-r16    MinSchedulingOffsetPreference-r16
OPTIONAL,
    releasePreference-r16                ReleasePreference-r16          OPTIONAL,
    sl-UE-AssistanceInformationNR-r16    SL-UE-AssistanceInformationNR-r16
OPTIONAL,
    referenceTimeInfoPreference-r16   BOOLEAN
OPTIONAL,
    nonCriticalExtension                 SEQUENCE { }                   OPTIONAL
}
MinSchedulingOffsetPreference-r16 ::= SEQUENCE {
    preferredK0-r16                      SEQUENCE {
        preferredK0-SCS-15kHz-r16            ENUMERATED {sl1, sl2, sl4, sl6}
OPTIONAL,
        preferredK0-SCS-30kHz-r16            ENUMERATED {sl1, sl2, sl4, sl6}
OPTIONAL,
        preferredK0-SCS-60kHz-r16            ENUMERATED {sl2, sl4, sl8, sl12}
OPTIONAL,
        preferredK0-SCS-120kHz-r16           ENUMERATED {sl2, sl4, sl8, sl12}
OPTIONAL
    }                                                 OPTIONAL,
    preferredK2-r16                      SEQUENCE {
        preferredK2-SCS-15kHz-r16            ENUMERATED {sl1, sl2, sl4, sl6}
OPTIONAL,
        preferredK2-SCS-30kHz-r16            ENUMERATED {sl1, sl2, sl4, sl6}
OPTIONAL,
        preferredK2-SCS-60kHz-r16            ENUMERATED {sl2, sl4, sl8, sl12}
OPTIONAL,
        preferredK2-SCS-120kHz-r16           ENUMERATED {sl2, sl4, sl8, sl12}
OPTIONAL
    }                                                 OPTIONAL
}
```

Accordingly, the preferredK0 and preferredK2 may be enhanced for an IAB-MT with larger slot offsets. In one embodiment, a new RRC parameter minSchedulingOffset-Preference-MT may be defined in the RRC MinSchedulingOffsetPreference-MT IE as below. As an example, in this embodiment the preferredK0-MT is extended to a maximum of 12 slots for SCS 15 kHz/30 kHz and 24 slots for SCS 60 KHz/120 kHz, which can be further extended to larger slot offsets.

```
UEAssistanceInformation-v1610-IEs ::= SEQUENCE {
    idc-Assistance-r16                   IDC-Assistance-r16             OPTIONAL,
    drx-Preference-r16                   DRX-Preference-r16             OPTIONAL,
    maxBW-Preference-r16                     MaxBW-Preference-r16
OPTIONAL,
    maxCC-Preference-r16                     MaxCC-Preference-r16
OPTIONAL,
    maxMIMO-LayerPreference-r16              MaxMIMO-LayerPreference-r16
OPTIONAL,
    minSchedulingOffsetPreference-r16    MinSchedulingOffsetPreference-r16
OPTIONAL,
    minSchedulingOffsetPreference-MT     MinSchedulingOffsetPreference-MT
OPTIONAL,
    releasePreference-r16                ReleasePreference-r16          OPTIONAL,
    sl-UE-AssistanceInformationNR-r16    SL-UE-AssistanceInformationNR-r16
OPTIONAL,
    referenceTimeInfoPreference-r16   BOOLEAN
OPTIONAL,
    nonCriticalExtension                 SEQUENCE { }                   OPTIONAL
}
MinSchedulingOffsetPreference-MT ::= SEQUENCE {
    preferredK0-MT                       SEQUENCE {
        preferredK0-SCS-15kHz-MT             ENUMERATED
{sl1,sl2,sl4,sl6,sl8,sl10,sl12}          OPTIONAL,
        preferredK0-SCS-30kHz-MT             ENUMERATED
{sl1,sl2,sl4,sl6,sl8,sl10,sl12}          OPTIONAL,
        preferredK0-SCS-60kHz-MT             ENUMERATED
{sl2,sl4,sl8,sl12,sl16,sl20,sl24}        OPTIONAL,
        preferredK0-SCS-120kHz-MT                ENUMERATED
{sl2,sl4,sl8,sl12,sl16,sl20,sl24}        OPTIONAL
    }                                                 OPTIONAL,
    preferredK2-MT                       SEQUENCE {
        preferredK2-SCS-15kHz-MT             ENUMERATED
```

-continued

```
{sl1,sl2,sl4,sl6,sl8,sl10,sl12}        OPTIONAL,
        preferredK2-SCS-30kHz-MT               ENUMERATED
{sl1,sl2,sl4,sl6,sl8,sl10,sl12}        OPTIONAL,
        preferredK2-SCS-60kHz-MT               ENUMERATED
{sl2,sl4,sl8,sl12,sl16,sl20,sl24}      OPTIONAL,
        preferredK2-SCS-120kHz-MT              ENUMERATED
{sl2,sl4,sl8,sl12,sl16,sl20,sl24}      OPTIONAL
                                                       OPTIONAL
    }
}
``` preferredK0-MT

The preferredK0-MT parameter indicates the IAB-MT's preferred value of k0 (slot offset between the DCI and its scheduled PDSCH) for cross-slot scheduling for power saving. The value is defined for each subcarrier spacing (numerology) in units of slots: sl1 corresponds to 1 slot, sl2 corresponds to 2 slots, sl4 corresponds to 4 slots, and so on. If a value for a particular subcarrier spacing is absent, it is interpreted as the IAB-MT having no preference on k0 for cross-slot scheduling for that subcarrier spacing. If the field is absent from the MinSchedulingOffsetPreference-MT IE, it is interpreted as the IAB-MT having no preference on k0 for cross-slot scheduling.

preferredK2-MT

The preferredK2-MT parameter indicates the IAB-MT's preferred value of k2 (the slot offset between DCI and its scheduled PUSCH) for cross-slot scheduling for power saving. The value is defined for each subcarrier spacing (numerology) in units of slots: sl1 corresponds to 1 slot, sl2 corresponds to 2 slots, sl4 corresponds to 4 slots, and so on. If a value for a particular subcarrier spacing is absent, it is interpreted as the IAB-MT having no preference on k2 for cross-slot scheduling for that subcarrier spacing. If the field is absent from the MinSchedulingOffsetPreference-MT IE, it is interpreted as the IAB-MT having no preference on k2 for cross-slot scheduling.

minSchedulingOffsetPreference-MT

The minSchedulingOffsetPreference-MT parameter indicates the IAB-MT's preferences on minimumScheduling-Offset of cross-slot scheduling for power saving.

Enhance K0 in RRC PDSCH-TimeDomainResourceAllocation IE and K2 in RRC PUSCH-TimeDomainResourceAllocation IE for an IAB-MT One embodiment to enhance K0 in the RRC PDSCH-TimeDomainResourceAllocation IE and K2 in the RRC PUSCH-TimeDomainResourceAllocation IE for an IAB-MT is shown below. In this embodiment K0/K2 is extended to a maximum value of 64, which can be further extended to larger values.

```
PDSCH-TimeDomainResourceAllocation ::=           SEQUENCE {
    k0                      INTEGER(0..32)           OPTIONAL,
    k0-MT                   INTEGER(0..64)              OPTIONAL,
    mappingType                    ENUMERATED {typeA, typeB},
    startSymbolAndLength           INTEGER (0..127)
}
PUSCH-TimeDomainResourceAllocation-r16 ::=             SEQUENCE {
    k2-r16                  INTEGER(0..32)           OPTIONAL,
    k2-MT                   INTEGER(0..64)           OPTIONAL,
    puschAllocationList-r16               SEQUENCE (SIZE(1..maxNrofMultiplePUSCHs-
r16)) OF
                                    PUSCH-Allocation-r16,
        ...
}
``` k0-MT

The k0-MT parameter is the slot offset between the DCI and its scheduled PDSCH for an IAB-MT. When the field is absent, the IAB-MT applies the value 0.

k2-MT

The k2-MT parameter corresponds to L1 parameter 'K2' for an IAB-MT. When the field is absent, the IAB-MT applies the value 1 when the PUSCH SCS is 15/30 kHz, the value 2 when the PUSCH SCS is 60 kHz, and the value 3 when the PUSCH SCS is 120 KHz.

Enhance maxK0-SchedulingOffset and maxK2-Scheduling-Offset for an IAB-MT

In one embodiment, the maxK0-SchedulingOffset and maxK2-SchedulingOffset parameter for an IAB-MT may be enhanced as shown below. In this embodiment, the maxK0-SchedulingOffset/maxK2-SchedulingOffset parameters are extended to a maximum value of 32, which can be further extended to larger values.

maxK0-SchedulingOffset-MT INTEGER::=32–Max #of slots configured as min. scheduling offset (K0)

maxK2-SchedulingOffset-MT INTEGER::=32–Max #of slots configured as min. scheduling offset (K2)

The various embodiments for the early PDSCH/PUSCH beam indication for IAB-MT can be applied independently or jointly.

Figure 6:
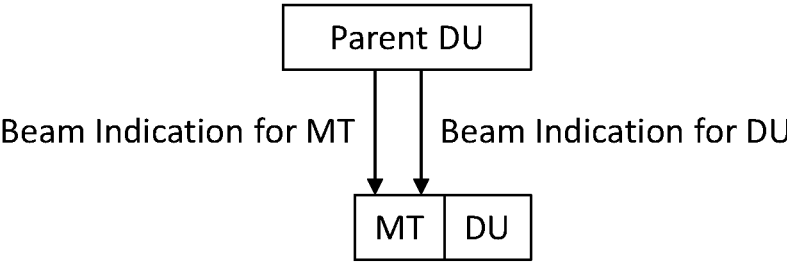
FIG. 6 illustrates an explicit beam indication restriction in accordance with some embodiments.

Beam Indication Enhancement Option 3: Explicit Beam Indication from the Parent DU to the IAB-DU In this beam indication enhancement option, in addition to the beam indication for an IAB-MT, the parent DU can also provide an explicit beam indication to the co-located IAB-DU. FIG. 6 illustrates an explicit beam indication restriction in accordance with some embodiments. Although one explicit indication from the parent DU for an IAB-DU's PDSCH beam indication is shown, the beam indication of other channels can be applied similarly.

Enhance RRC Configured TCI-State for an IAB-DU

In one embodiment, the IAB-MT's configuration may be re-used for the IAB-DU. In this case, up to 128 TCI states related to the parent-DU's reference signal (SSB/CSI-RS) may be provide by RRC signaling as below in Rel-16 specification TS 38.331.

```
TCI-State ::=          SEQUENCE {
    tci-StateId          TCI-StateId,
    qcl-Type1              QCL-Info,
    qcl-Type2              QCL-Info          OPTIONAL,
    ...
}
QCL-Info ::=          SEQUENCE {
    cell            ServCellIndex          OPTIONAL,
    bwp-Id              BWP-Id              OPTIONAL,
    referenceSignal          CHOICE {
        csi-rs              NZP-CSI-RS-ResourceId,
        ssb              SSB-Index
    },
    qcl-Type              ENUMERATED {typeA, typeB, typeC, typeD},
    ...
}
``` where the TCI-StateID identifies a TCI configuration and the QCL type is specified in TS 38.214 and may be defined for different downlink reference signals.

The IAB-DU's TCI states related to the IAB-DU's reference signal (SSB/CSI-RS) configured by RRC signaling may be enhanced by addition of a TCI-State-DU IE (and corresponding QCL-Info-DU), which is specific to the collocated IAB-DU.

```
TCI-State-DU ::=            SEQUENCE {
  tci-StateId-DU           TCI-StateId-DU,
  qcl-Type1-DU             QCL-Info-DU,
  qcl-Type2-DU             QCL-Info-DU           OPTIONAL,
  ...
}
QCL-Info-DU ::=            SEQUENCE {
  Cell-DU        ServCellIndex-DU        OPTIONAL,
  referenceSignal-DU          CHOICE {
    csi-rs-DU                 NZP-CSI-RS-ResourceId-DU,
    ssb-DU                    SSB-Index-DU
  },
  qcl-Type       ENUMERATED {typeA, typeB, typeC, typeD},
  ...
}
```

Enhance MAC-CE Activation/Deactivation of TCI States for an IAB-DU

In the current NR specification TS 38.321, the LCID field that identifies the logical channel instance of the corresponding MAC SDU or the type of the corresponding MAC CE or padding for the DL-SCH. One of the reserved LCIDs (LCID 35-46) may be used to transmit the TCI states activation/deactivation for the IAB-DU-specific PDSCH.

The TCI States Activation/Deactivation for the IAB-DU-specific PDSCH MAC CE can have a variable size that includes different fields. FIG. 7 illustrates TCI activation in accordance with some embodiments. The Ti field is set to 1 to indicate that the TCI state with TCI-StateId-DU i is to be activated and is set to 0 to indicate that the TCI state with TCI-StateId-DU i is to be deactivated. The maximum number of activated TCI states for the IAB-DU can be set to 8 or larger value.

Enhance DCI TCI Indication for an IAB-DU

In the current NR specification, the DCI can be used to further identify one of the MAC CE selected candidate TCI states for the IAB-MT's PDSCH. The TCI field in DCI is fixed to 3 bits and the indicated TCI is selected from the candidate TCI states in the IAB-MT's PDSCH slot. If the TCI is not present in the DCI, the PDSCH follows the TCI of the scheduling PDCCH. Accordingly, a TCI-DU field may be added to the DCI to identify one of the MAC CE selected candidate TCI states for an IAB-DU's PDSCH. The TCI-DU field in the DCI can be fixed to 3 bits or more and the indicated TCI is selected from the candidate TCI-DU states in the IAB-DU's PDSCH slot.

As above, the various embodiments in the explicit beam indication from the parent DU to the IAB-DU can be applied independently or jointly.

Thus, in some embodiments the IAB node may be provided a set of reference signal resource indexes by the parent IAB node. The indexes indicate QCL properties of the IAB-DU of the IAB node. The indexes may be used to limit simultaneous transmission and reception from the (collocated) IAB-MT and transmission from the IAB-DU by a child IAB-DU restricted beam indication MAC CE.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for an integrated access backhaul (IAB), the apparatus comprising:

processing circuitry to configure the IAB to:

receive, from a parent IAB distributed unit (DU) (IAB-DU), a configuration comprising a beam restriction and an early physical downlink shared channel (PDSCH) beam indication and an early physical uplink shared channel (PUSCH) beam indication for transmission using Spatial Division Multiplexing (SDM) by a Mobile-Termination (MT) of the IAB (IAB-MT) of an IAB-MT-specific PDSCH and an IAB-MT-specific PUSCH, respectively, the beam restriction indicating a set of beams not to be used for the transmission, the early PDSCH and PUSCH beam indication indicating a beam to be used for the transmission;

transmit, via at least one beam other than the set of beams, at least one of: the IAB-MT-specific PDSCH to a child device or the IAB-MT-specific PUSCH to the parent IAB-DU; and decode a radio resource control (RRC) MinSchedulingOffsetPreference-MT information element (IE) that contains a minSchedulingOffsetPreference-MT parameter, the minSchedulingOffsetPreference-MT parameter including preferred K0 and K2 parameters for each of a plurality of subcarrier spacings (SCS), the early PDSCH and PUSCH beam indication provided for power saving by enabling larger slot offsets for the preferred K0 and K2 parameters for each SCS than corresponding preferred K0 and K2 parameters for each SCS in a minSchedulingOffsetPreference-r16 parameter; and a memory configured to store the beam restriction, early PDSCH beam indication, and early PUSCH beam indication.

2. The apparatus of claim 1, wherein the processing circuitry is configured to decode a RRC PDSCH-config information element IE that contains Transmission Configuration Indicator (TCI) states that indicate the set of beams not to be used.

3. The apparatus of claim 1, wherein the processing circuitry is configured to decode a Medium Access Control (MAC) control element (CE) from the parent IAB-DU that contains Transmission Configuration Indicator (TCI) states that indicate the set of beams not to be used.

4. The apparatus of claim 3, wherein the MAC CE contains a logical channel identifier (LCID) field having reserved LCIDs 35-46 that contain the TCI states.

5. The apparatus of claim 3, wherein a Ti field in the MAC CE is set to:

a first value to indicate that a TCI state with TCI-StateId-Restrict i is restricted, and a second value to indicate that the TCI state with TCI-StateId-Restrict i is de-restricted.

6. The apparatus of claim 1, wherein the processing circuitry is configured to decode an IAB-MT-specific physical downlink control channel (PDCCH) having downlink control information (DCI) containing Transmission Configuration Indicator (TCI) states that indicate the set of beams not to be used.

7. The apparatus of claim 6, wherein the DCI contains a TCI-restrict field to restrict a Medium Access Control (MAC) control element (CE) restricted TCI state for the IAB-MT-specific PDSCH.

8. The apparatus of claim 1, wherein:

K0 is an L1 delay offset parameter between downlink control information (DCI) in a physical downlink control channel (PDCCH) and a PDSCH scheduled by the PDCCH, and K2 is an L1 delay offset parameter between an uplink (UL) assignment in the PDCCH and a PUSCH scheduled by the PDCCH.

9. The apparatus of claim 1, wherein:

the processing circuitry is configured to decode a RRC PDSCH-TimeDomainResourceAllocation IE and a PUSCH-TimeDomainResourceAllocation IE, the PDSCH-TimeDomainResourceAllocation IE includes a K0-MT parameter that indicates a K0 value for the IAB-MT, the PUSCH-TimeDomainResourceAllocation IE includes a K2-MT parameter that indicates a K2 value for the IAB-MT, K0 is an L1 delay offset parameter between downlink control information (DCI) in a physical downlink control channel (PDCCH) and a PDSCH scheduled by the PDCCH, and K2 is an L1 delay offset parameter between an uplink (UL) assignment in the PDCCH and a PUSCH scheduled by the PDCCH.

10. The apparatus of claim 1, wherein:

the processing circuitry is configured to decode RRC maxK0-SchedulingOffset-MT and maxK2-SchedulingOffset-MT parameters for the IAB-MT, the maxK0-SchedulingOffset-MT and maxK2-SchedulingOffset-MT parameters providing maximum K0 and K2 values for the IAB-MT, K0 is an L1 delay offset parameter between downlink control information (DCI) in a physical downlink control channel (PDCCH) and a PDSCH scheduled by the PDCCH, and K2 is an L1 delay offset parameter between an uplink (UL) assignment in the PDCCH and a PUSCH scheduled by the PDCCH.

11. The apparatus of claim 1, wherein the processing circuitry is configured to decode an explicit beam indication to a collocated IAB-DU collocated with the IAB-MT to indicate a beam for the collocated IAB-DU to use in communication with a child of the collocated IAB-DU.

12. The apparatus of claim 11, wherein the processing circuitry is configured to decode, as the explicit beam indication, a RRC TCI-State-DU IE containing Transmission Configuration Indicator (TCI) state information specific to the collocated IAB-DU.

13. The apparatus of claim 11, wherein the processing circuitry is configured to decode, as the explicit beam indication, an IAB-DU-specific PDSCH Medium Access Control (MAC) control element (CE) that contains Transmission Configuration Indicator (TCI) states as the set of beams for the IAB-MT-specific PDSCH.

14. The apparatus of claim 13, wherein a Ti field in the IAB-DU-specific PDSCH MAC CE is set to:

a first value to indicate that a TCI state with TCI-StateId-Restrict i is activated, and a second value to indicate that the TCI state with TCI-StateId-Restrict i is de-activated.

15. The apparatus of claim 11, wherein the processing circuitry is configured to decode an IAB-MT-specific physical downlink control channel (PDCCH) having downlink control information (DCI), the DCI containing a Transmission Configuration Indicator (TCI)-DU field to identify one of a plurality of candidate TCI states of an IAB-DU-specific PDSCH Medium Access Control (MAC) control element (CE) as the explicit beam indication.

16. The apparatus of claim 15, wherein an indicated TCI is selected from candidate TCI-DU states in a PDSCH slot of the collocated IAB-DU.

17. An apparatus for an integrated access backhaul (IAB), the apparatus comprising:

processing circuitry to configure the IAB to:

receive, for transmission to a Mobile-Termination (MT) of a child IAB (IAB-MT), a configuration comprising a beam restriction and an early physical downlink shared channel (PDSCH) beam indication and an early physical uplink shared channel (PUSCH) beam indication for transmission by the IAB-MT of an IAB-MT-specific PDSCH and an IAB-MT-specific PUSCH, respectively, using Spatial Division Multiplexing (SDM), the beam restriction indicating beams not to be used for the transmission, the early PDSCH and PUSCH beam indication indicating a beam to be used for the transmission; and decode a radio resource control (RRC) MinSchedulingOffsetPreference-MT information element (IE) that contains a minSchedulingOffsetPreference-MT parameter, the minSchedulingOffsetPreference-MT parameter including preferred K0 and K2 parameters for each of a plurality of subcarrier spacings (SCS), the early PDSCH and PUSCH beam indication provided for power saving by enabling larger slot offsets for the preferred K0 and K2 parameters for each SCS than corresponding preferred K0 and K2 parameters for each SCS in a minSchedulingOffsetPreference-r16 parameter; and a memory configured to store the beam restriction, early PDSCH beam indication, and early PUSCH beam indication.

18. The apparatus of claim 17, wherein to indicate the beams not to be used, the processing circuitry is configured to encode, for transmission to the IAB-MT, at least one of:

RRC PDSCH-config IE that contains Transmission Configuration Indicator (TCI) state, a Medium Access Control (MAC) control element (CE) that contains TCI states having a first value to indicate restriction of an associated beam and a second value to indicate de-restriction of the associated beam, or an IAB-MT-specific physical downlink control channel (PDCCH) having downlink control information (DCI) containing a TCI-restrict field to restrict an associated TCI state.

19. A non-transitory computer-readable storage medium that stores instructions for execution by one or more processors of an integrated access backhaul (IAB), the one or more processors to configure the IAB to, when the instructions are executed:

receive, from a parent IAB distributed unit (DU) (IAB-DU), a configuration comprising a beam restriction and an early physical downlink shared channel (PDSCH) beam indication and an early physical uplink shared channel (PUSCH) beam indication for transmission using Spatial Division Multiplexing (SDM) by a Mobile-Termination (MT) of the IAB (IAB-MT) of an IAB-MT-specific PDSCH and an IAB-MT-specific PUSCH, respectively, the beam restriction indicating a set of beams not to be used for the transmission, the early PDSCH and PUSCH beam indication indicating a beam to be used for the transmission;

decode a radio resource control (RRC) MinSchedulingOffsetPreference-MT information element (IE) that contains a minSchedulingOffsetPreference-MT parameter, the minSchedulingOffsetPreference-MT parameter including preferred K0 and K2 parameters for each of a plurality of subcarrier spacings (SCS), the early PDSCH and PUSCH beam indication provided for power saving by enabling larger slot offsets for the preferred K0 and K2 parameters for each SCS than corresponding preferred K0 and K2 parameters for each SCS in a minSchedulingOffsetPreference-r16 parameter; and transmit, via at least one beam other than the set of beams, at least one of: the IAB-MT-specific PDSCH to a child device or the IAB-MT-specific PUSCH to the parent IAB-DU.

20. The non-transitory computer-readable storage medium of claim 19, wherein to indicate the beams not to be used, when executed the instructions further configure the one or more processors to decode, from the parent IAB-DU, at least one of:

a RRC PDSCH-config IE that contains Transmission Configuration Indicator (TCI) state, a Medium Access Control (MAC) control element (CE) that contains TCI states having a first value to indicate restriction of an associated beam and a second value to indicate de-restriction of the associated beam, or an IAB-MT-specific physical downlink control channel (PDCCH) having downlink control information (DCI) containing a TCI-restrict field to restrict an associated TCI state.

\* \* \* \* \*